United States Patent
Yoo et al.

(10) Patent No.: US 11,645,373 B2
(45) Date of Patent: May 9, 2023

(54) ELECTRONIC DEVICE FOR BIOMETRICS AND METHOD THEREOF

(71) Applicant: Samsung Electronics Co., Ltd., Gyeonggi-do (KR)

(72) Inventors: Juwoan Yoo, Gyeonggi-do (KR); Wonsuk Jang, Gyeonggi-do (KR); Heejun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 17/130,098

(22) Filed: Dec. 22, 2020

(65) Prior Publication Data
US 2021/0200846 A1    Jul. 1, 2021

(30) Foreign Application Priority Data

Dec. 26, 2019  (KR) ......................... 10-2019-0175598

(51) Int. Cl.
*G06F 21/32*    (2013.01)
*G06V 40/16*    (2022.01)

(52) U.S. Cl.
CPC ............ *G06F 21/32* (2013.01); *G06V 40/168* (2022.01); *G06V 40/172* (2022.01)

(58) Field of Classification Search
CPC .... G06F 21/32; G06V 40/168; G06V 40/172; G06V 40/70; G06V 40/10; G06V 10/40; G06K 9/6201
See application file for complete search history.

(56) References Cited

U.S. PATENT DOCUMENTS

| | | | |
|---|---|---|---|
| 2006/0271525 | A1 | 11/2006 | Sukegawa |
| 2017/0032181 | A1 | 2/2017 | Hu |
| 2017/0140212 | A1 | 5/2017 | Lo et al. |
| 2017/0330028 | A1* | 11/2017 | Lo ........................ G06K 9/6215 |
| 2018/0129868 | A1 | 5/2018 | Sarkis et al. |
| 2018/0285629 | A1 | 10/2018 | Son et al. |
| 2019/0370450 | A1 | 12/2019 | Fletcher et al. |

FOREIGN PATENT DOCUMENTS

| | | |
|---|---|---|
| EP | 1727074 A2 | 11/2006 |
| EP | 2091021 A1 | 8/2009 |
| EP | 3528158 A2 | 8/2019 |

(Continued)

OTHER PUBLICATIONS

International Search Report dated Apr. 19, 2021.
European Search Report dated Oct. 10, 2022.

*Primary Examiner* — Premal R Patel
(74) *Attorney, Agent, or Firm* — Cha & Reiter, LLC

(57) ABSTRACT

Certain embodiments provide a biometric recognition apparatus and a method for lowering false recognition rate of biometric information in an electronic device adopting biometric recognition technology. In doing so, the electronic device may store first feature values extracted at M-ary feature points from owner biometric information, and additionally store auxiliary biometric information from a biometric information stored in one or more memories or an external server. The electronic device may perform biometric recognition on input biometric information using the first feature values and second feature values extracted from the biometric information additionally stored.

22 Claims, 9 Drawing Sheets

(56) References Cited

FOREIGN PATENT DOCUMENTS

| | | |
|---|---|---|
| JP | 2004-78686 A | 3/2004 |
| JP | 2007-67783 A | 3/2007 |
| JP | 2011034133 A | 2/2011 |
| JP | 6714634 B2 | 6/2020 |
| KR | 10-0898766 B1 | 5/2009 |
| KR | 10-1117549 B1 | 3/2012 |
| KR | 10-2016-0124574 A | 10/2016 |

\* cited by examiner

ELECTRONIC DEVICE FOR BIOMETRICS AND METHOD THEREOF

CROSS-REFERENCE TO RELATED APPLICATION(S)

This application is based on and claims priority under 35 U.S.C. § 119 to Korean Patent Application No. 10-2019-0175598, filed on Dec. 26, 2019 in the Korean Intellectual Property Office, the disclosure of which is incorporated by reference herein in its entirety.

TECHNICAL FIELD

One or more embodiments disclosed herein relate generally to an apparatus and a method for recognizing biometric information in an electronic device that has adopted biometric recognition technology.

BACKGROUND

Biometric recognition technology extracts physiological or behavioral characteristics measurable from a human, and compares and/or identifies the individual based on the extracted physiological or behavioral characteristics. That is, the biometric recognition technology may be used to identify the individual using one or more biometric characteristics such as physiological characteristics or behavioral characteristics. Biometric information may be extracted using methods such as fingerprint recognition, iris scan, retina recognition, hand geometry recognition, and facial recognition. Biometric information based on the behavioral characteristic may be extracted using methods such as voice recognition or signature-scan.

For example, the biometric recognition technology may be utilized to identify authorized or unauthorized individuals for a particular device using the individual's physiological or behavioral characteristic(s). In particular, the biometric recognition technology is used in fields such as financial services, network security, or health care.

SUMMARY

A particular biometric recognition technology may provide a "search function" for finding one of unspecified individuals by use of one piece of biometric information, and an "inquiry function" for determining whether multiple biometric information belong to the same individual. In doing so, the biometric information needs to satisfy requirements such as universality (common to every individual), uniqueness (unique per individual), permanence (invariant over time), collectability (quantitatively measurable), performance (high performance regardless of environmental change), acceptability (individuals are willing to have their biometric trait captured and assessed) and circumvention (safe from being hacked).

Table 1 shows the satisfaction levels of the various requirements of various types of biometric information.

TABLE 1

| biometric information | universality | uniqueness | permanence | collectability | performance | acceptability | circumvention |
|---|---|---|---|---|---|---|---|
| facial recognition | high | low | medium | high | low | high | low |
| fingerprint recognition | medium | high | high | medium | high | medium | high |
| hand geometry recognition | medium | medium | medium | medium | medium | medium | high |
| iris scan | high | high | high | medium | high | low | high |
| retina recognition | high | high | medium | low | high | low | high |
| Signature recognition | low | low | low | high | low | high | low |
| voice recognition | medium | low | low | medium | low | high | low |

As shown in Table 1, biometric recognition based on facial, signature, and voice recognition exhibits relatively low satisfaction levels in uniqueness and circumvention. For example, face recognition may be subject to false recognition due to individuals having similar faces, such as family members. In addition, since an unauthorized individual may be able to obtain a photograph of an authorized individual's face, face recognition may be more susceptible to circumvention than other recognition techniques, such as ones using other pieces of biometric information. In addition, fingerprint recognition and voice recognition may also exhibit false recognition with low uniqueness.

According to an embodiment of the disclosure, an electronic device may include one or more memories and at least one processor for accessing the one or more memories, wherein at least one of the one or more memories may store instructions, when executed, causing the at least one processor to determine M-ary feature points to obtain first feature values from owner biometric information, and identify auxiliary biometric information from a biometric information stored in at least one of the one or more memories or an external server, wherein the auxiliary biometric information has similar feature values with the owner biometric information at the M-ary feature points.

According to an embodiment of the disclosure, a biometric authentication method in an electronic device may include determining M-ary feature points to obtain first feature values from owner biometric information, identifying auxiliary biometric information from a biometric information stored in at least one of one or more memories or an external server, and performing biometric authentication on input biometric information based on the owner biometric information and auxiliary biometric information, wherein the auxiliary biometric information has similar feature values with the owner biometric information at the M-ary feature points.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

Figure 1:
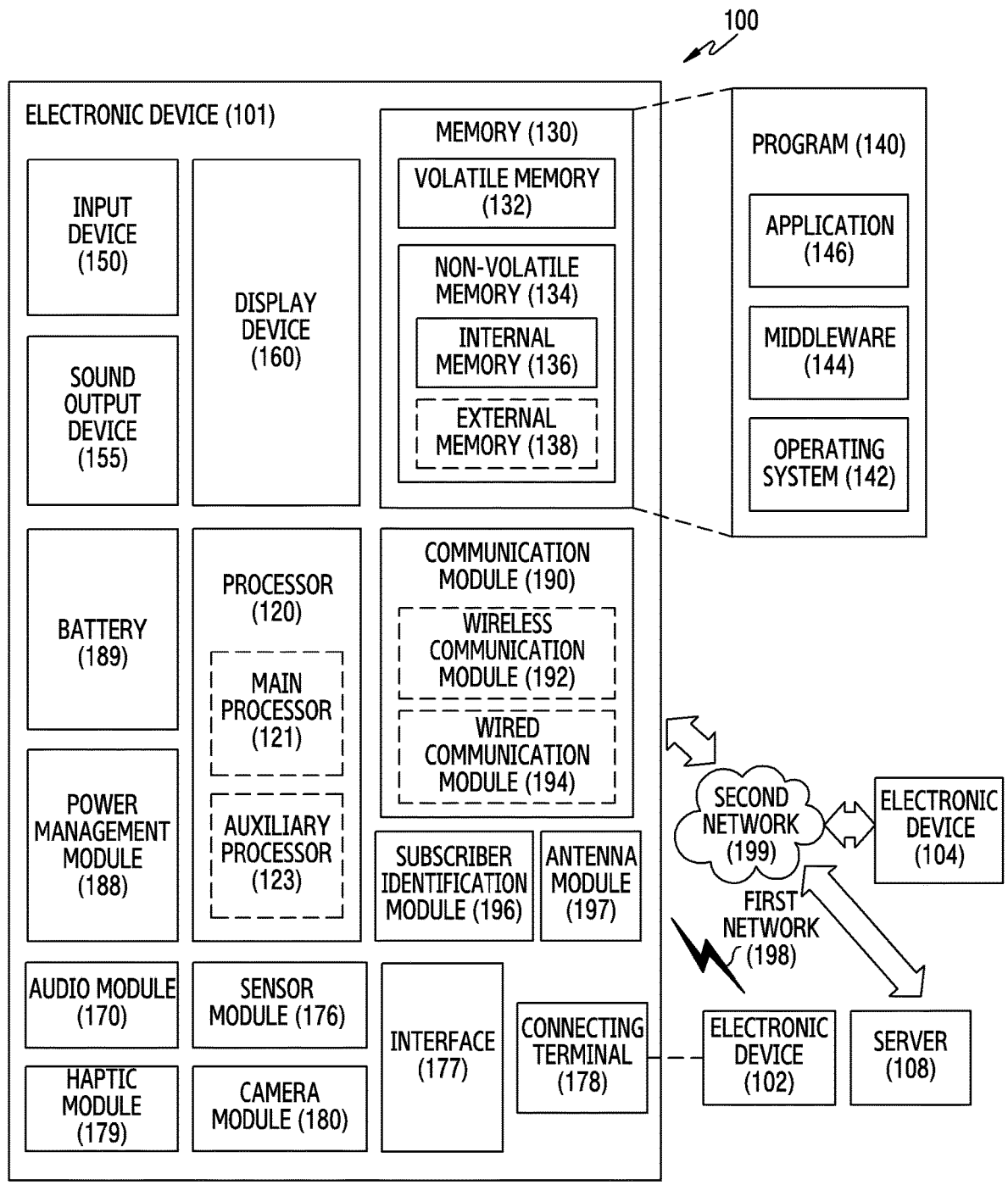
FIG. 1 is a block diagram of an electronic device 101 according to an embodiment of the disclosure.

Hereinafter, various embodiments of the disclosure shall be explained.

Certain embodiments of the disclosure may provide a biometric recognition apparatus and a method for lowering false recognition rate of biometric information in an electronic device capable of biometric recognition.

Certain embodiments of the disclosure may provide an apparatus and a method for performing user authentication using additional biometric information which may generate false recognition in an electronic device capable of biometric recognition.

In the following descriptions, certain embodiments provide an electronic device that performs biometric recognition by matching input biometric information with owner biometric information and auxiliary biometric information. The owner biometric information may be inputted by an owner, the auxiliary biometric information may have high similarity with the owner biometric information, and the input biometric information may be inputted for the biometric recognition.

The following descriptions shall provide 1) embodiments for collecting the auxiliary biometric information, 2) embodiments for generating an auxiliary matcher to which auxiliary feature values extracted from the collected auxiliary biometric information are applied, and 3) embodiments for performing the biometric recognition on input feature values extracted from the input biometric information using a main matcher generated by applying main feature values extracted from the owner biometric information and the auxiliary matcher.

According to an embodiment, the biometric information may be data or signal inputted or acquired through various means such as a camera, a sensor, and a touch panel, or may be data or signal (e.g., data representing a biometric information such as a photo) prestored in a memory. The data or the signal inputted, acquired or prestored may be, for example, raw data not processed at all. The raw data may be, for example, data captured by the camera, a signal sensed by a sensor or a signal outputted from a touch panel according to a user touch. In this case, biometric information corresponding to the raw data may be processed through normalization or characterization by an algorithm designated by a processor of an electronic device.

According to an embodiment, the biometric information may correspond to the data or the signal inputted or acquired through various means or prestored in the memory. The data or the signal prestored in the memory may be processed through normalization or characterization of the designated algorithm and then be outputted as the biometric information. In this case, a microprocessor for normalization or characterization of the data or signal corresponding to the biometric information may be included in the various means such as the camera, sensor, or touch panel or may be separately implemented. The microprocessor may output the biometric information by, for example, normalizing or characterizing the raw data inputted, acquired, or prestored using the designated algorithm.

For the sake of simplicity it is described that the biometric information is outputted by normalizing or characterizing the raw data using the designated algorithm, and the particular entity (e.g. microprocessor) performing the normalization or characterization is not specified. Hence, embodiments of the disclosure are not limited to a particular entity (e.g., camera, sensor, touch panel, or the processor of the electronic device) performing the normalization or characterization. Thus, various embodiments of the disclosure may be implemented regardless of the entity performing the normalization or characterization.

According to an embodiment, the biometric information may include biometric information corresponding to behavioral characteristic such as voice or signature, and biometric information corresponding to physiological characteristic such as fingerprint, iris, retina, face, or hand geometry. Hereafter, "biometric type" may be used as the technical term for distinguishing the various types of biometric information such as the fingerprint, the iris, the retina, the hand geometry, the face, the voice or the signature, and "biometric information type" may be used as the technical term for distinguishing the biometric information corresponding to the biometric type.

According to an embodiment, the auxiliary biometric information may be collected 1) according to user (owner) selection, 2) from an image among stored images that include an object (e.g., fingerprint, iris, retina, hand geometry, face, or signature) having high similarity with owner biometric information, 3) from biometric information of previously failed biometric recognition or 4) from other biometric information if the biometric recognition with first biometric information of multiple biometric information for the biometric recognition fails.

According to an embodiment, the processor may execute the matcher using a biometric authentication database (template) which temporarily stores reference information, identify through the executed matcher whether information extracted from a requester for the authentication belongs to the owner, and verify that the requester is the owner based on the result. The reference information may be, for example, a first feature value extracted from the owner biometric information. The extracted information may be, for example, a second feature value extracted from the input biometric information of the requester. The first feature value and the second feature value may be extracted by applying techniques to extract feature points from the biometric information. In this case, the processor may compare the first feature value and the second feature value using the matcher, and determine that the biometric authentication requester is the owner if the comparison result is determined to be similar enough to satisfy a preset threshold.

According to an embodiment, the processor may execute the main matcher using the stored main feature values, identify through the executed main matcher whether the input feature value extracted from the input biometric information belongs to the owner, and verify that the requester corresponding to the input biometric information is the owner, based on the identifying result. The main feature values may be extracted from the owner biometric information and temporarily stored in the biometric authentication database (template).

According to an embodiment, the processor may extract auxiliary feature values from the auxiliary biometric information collected by extracting the main feature values from the owner biometric information, select feature values distinguished from the main feature values from among the extracted auxiliary feature values, and execute the auxiliary matcher by applying the selected feature values.

According to an embodiment, the processor may perform the biometric recognition in primary biometric recognition which examines similarity between the input biometric information and the owner biometric information using the main matcher, and secondary biometric recognition which, if the primary biometric recognition succeeds in the biometric recognition, examines similarity between the input biometric information and the auxiliary biometric information using the auxiliary matcher. In the biometric recognition, if the primary biometric recognition succeeds in the biometric recognition and the secondary biometric recognition fails the biometric recognition, the processor may determine that the biometric recognition on the input biometric information is successful.

According to another embodiment, if the biometric recognition is successful in both of the primary biometric recognition and the secondary biometric recognition, the processor may determine that the biometric recognition of the input biometric information is successful if the input biometric information is more similar to the owner biometric information than the auxiliary biometric information.

Now, certain embodiments of the disclosure shall be described in detail by referring to the attached drawings.

FIG. 1 illustrates an electronic device in a network environment according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. Alternatively, at least one of the components (e.g., the display device 160 or the camera module 180) may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 includes a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thereto. The memory 130 includes the volatile memory 132 and the non-volatile memory 134.

The program 140 may be stored in the memory 130 as software, and includes, for example, an operating system (OS) 142, middleware 144, or an application 146.

The input device 150 may receive a command or data to be used by another component of the electronic device 101 (e.g., the processor 120), from the outside (e.g., a user) of the electronic device 101. The input device 150 may include a microphone, a mouse, a keyboard, and/or a digital pen (e.g., a stylus pen).

The sound output device 155 may output sound signals to the outside of the electronic device 101. The sound output device 155 may include a speaker or a receiver. The speaker may be used for general purposes, such as playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, ISPs, or flashes.

The power management module 188 may manage power supplied to the electronic device 101. The power management module 188 may be implemented as at least part of a power management IC (PMIC).

The battery 189 may supply power to at least one component of the electronic device 101. The battery 189 may include a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency IC (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device may be one of various types of electronic devices. An electronic device may include a portable communication device (e.g., a smartphone), a computer device, a portable multimedia device, a portable medical device, a camera, a wearable device, or a home appliance. However, the electronic devices are not limited to the examples described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific IC (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

According to certain embodiments, the processor 120 may establish and manage a communication session between the electronic device 101 and a network, and may control a function for maintaining persistent communication based on a movement of the electronic device 101. According to an embodiment, the processor 120 may acquire a Tracking Area Identifier (TAI) list during an attach procedure or a Tracking Area Update (TAU) procedure. The TAI list may include an identifier of at least one tracking area managed by a corresponding Mobility Management Entity (MME). For example, when tracking areas managed by the MME are a first tracking area and a second tracking area, the TAI list may include an identifier of the first tracking area and an identifier of the second tracking area. The identifier of the tracking area may consist of a Public Land Mobile Network Identifier (PLMN ID) and/or a Tracking Area Code (TAC). For example, the processor 120 may transmit an attach request message for a network attach through the communication module 190, and may receive an attach accept message including the TAI list in response to the attach request message transmission. For another example, the processor 120 may transmit a TAU request message when there is a change in a tracking area in which the electronic device 101 is located or there is a change in a Radio Access Technology (RAT), and in response thereto, may receive a TAU accept message including the TAI list.

According to an embodiment, the processor 120 may store the acquired TAI list in the memory 130.

According to certain embodiments, the processor 120 may transmit the attach request message and/or the TAU request message, and may determine whether an attach failure and/or a TAU failure occurs. For example, when an attach is rejected or a TAU is rejected due to a weak electronic field situation or an unspecified cause, the processor 120 may recognize an occurrence of an attach failure caused by a low layer failure or a TAU failure caused by the low layer failure. For another example, when a response message for the attach request is not received within a specified first time duration from a timing at which the attach request message is transmitted, the processor 120 may determine that the attach has failed. The response message for the attach request may include at least one of an attach accept message and an attach reject message. The specified first time duration may be, for example, a time duration in which a T3410 timer runs. For another example, when the response message for the TAU request is not received within the specified second time duration from a timing at which the TAU request message is transmitted, the processor 120 may recognize that the TAU has failed. The response message for the TAU request may include at least one of a TAU accept message and a TAU reject message. The specified second time duration may be, for example, a time duration in which a T3430 timer runs.

According to certain embodiments, upon the occurrence of the attach failure and/or the TAU failure, the processor 120 may run the specified first timer (e.g., T3411). The first timer may be a timer for measuring a waiting timer for retransmission of the attach request message or retransmission of the TAU request message. For example, when the first timer expires, the processor 120 may retransmit the attach request message or the TAU request message. According to an embodiment, the processor 120 may perform cell reselection during the first timer runs. For example, the processor 120 may perform cell reselection for moving from a first cell in which the attach or the TAU is attempted on a neighboring second cell. Herein, as defined in the standard specification, the cell reselection may include not only a cell reselection operation of the electronic device 101 in an idle state after a network attach but also an operation in which the electronic device 101 that has lost a connection of the network camps on another cell.

According to an embodiment, when channel quality of the second cell is better than channel quality of the first cell, the processor 120 may allow cell reselection to be performed on the second cell through the communication module 190. According to an embodiment, irrespective of the channel quality of the first cell and the channel quality of the second cell, the processor 120 may forcibly bar the use of the first cell and may allow cell reselection to be performed on the second cell through the communication module 190. For example, even if the channel quality of the first cell is better than the channel quality of the second cell, the processor 120 may control the communication module 190 to perform cell reselection on the second cell relatively more adjacent than the first cell. According to an embodiment, the use of the first call may be forcibly barred only during the first timer runs, and the barring on the first cell may be released when the first timer expires, thereby returning to the first cell on the basis of channel quality.

According to certain embodiments, the processor 120 may determine whether a tracking area of the reselected second cell is included in the TAI list stored in the memory 130. For example, the processor 120 may compare a TAI of the reselected second cell and a TAI included in the TAI list stored in the memory 130 to determine whether the tracking area of the reselected second cell is included in the TAI list. According to an embodiment, if the tracking area of the reselected second cell is not included in the TAI list stored in the memory 130, the processor 120 may forcibly expire the first timer, and may transmit an attach request message or a TAU request message to a base station of the second cell. According to an embodiment, if the tracking area of the reselected second cell is included in the TAI list stored in the memory 130, the processor 120 may determine whether the first timer forcibly expires on the basis of the channel quality of the reselected second cell. For example, if received signal strength of the reselected second cell is greater than a threshold, the processor 120 may forcibly expire the first timer, and may transmit the attach request message or the TAU request message to the base station of the reselected second cell. For another example, if the received signal strength of the reselected second cell is less than or equal to the threshold, the processor 120 may wait until the first timer expires, and after the first timer expires, may transmit the attach request message or the TAU request message to the base station of the reselected second cell. According to an embodiment, if the tracking area of the reselected second cell is included in the TAI list stored in the memory 130, the processor 120 may forcibly expire the first timer irrespective of channel quality of the reselected second cell, and may retransmit the attach request message or the TAU request message. According to an embodiment, if the tracking area of the reselected second cell is not included in the TAI list stored in the memory 130, the processor 120 may transmit a service request message to the base station of the reselected second cell. For example, if the TAI of the reselected cell is included in the TAI list stored in the memory 130 in a situation where the first timer runs due to a TAU failure, the processor 120 may determine that there is no need to perform a TAU procedure. If it is determined that there is no need to perform the TAU procedure, the processor 120 may omit the operation of transmitting the TAU request message and may transmit the service request message.

Figure 2:
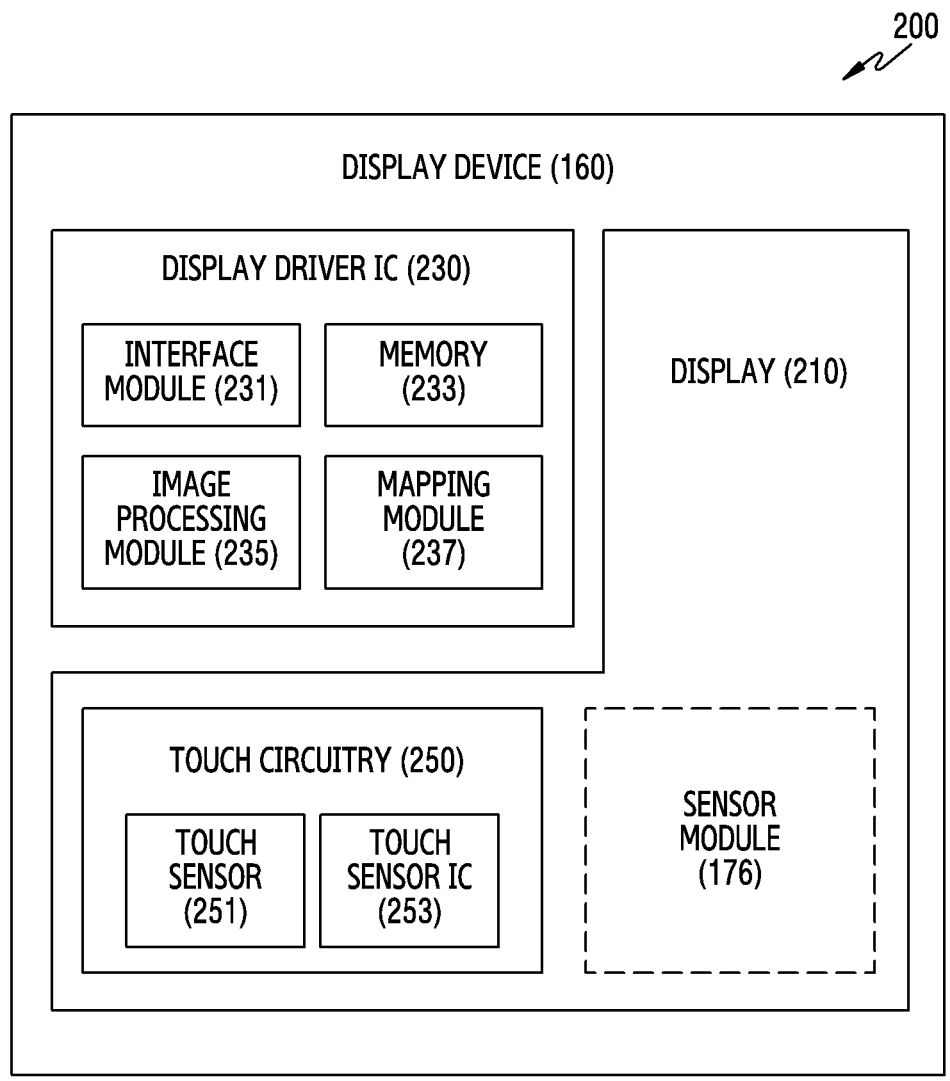
FIG. 2 is a block diagram of a display device 160 according to an embodiment of the disclosure.

FIG. 2 is a block diagram 200 illustrating the display device 160 according to an embodiment.

Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with input device 150 (e.g. touch circuitry) or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
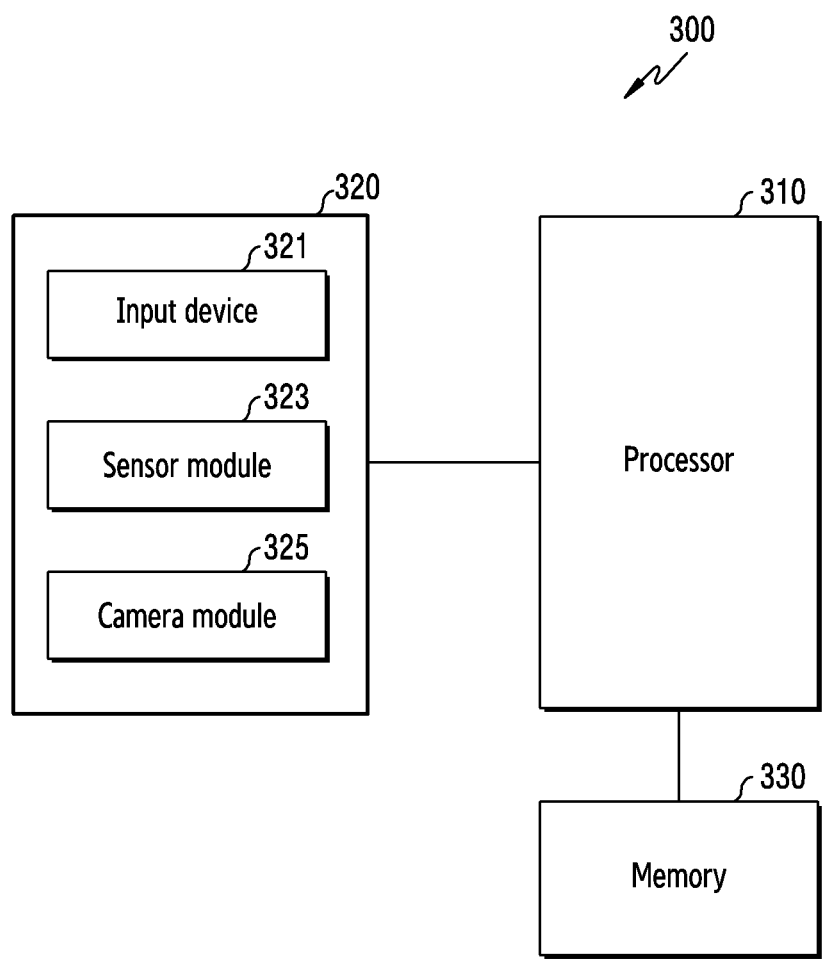
FIG. 3 is a block diagram of an electronic device 101 for performing biometric recognition according to an embodiment of the disclosure.

FIG. 3 is a block diagram 300 of an electronic device (e.g., the electronic device 101 of FIG. 1) for performing biometric authentication according to an embodiment of the disclosure.

Referring to FIG. 3, the electronic device 101 according to an embodiment may include, as components for the biometric recognition, a biometric recognition module 320, a processor 310 (e.g., the processor 120 of FIG. 1) or a memory 330 (e.g., the memory 130 of FIG. 1). The electronic device 101 may obtain biometric information of at least one of, for example, one or more biometric types (e.g., fingerprint, iris, retina, hand geometry, face, voice, signature), and recognize owner's biometric information by matching feature values extracted from the obtained biometric information with feature values of biometric information prestored by the owner (e.g., the owner of the electronic device 101 of FIG. 1). The biometric information may be, for example, raw data acquired by the biometric recognition module 320 or data processed by normalizing or characterizing the raw data. In this case, the biometric recognition module 320 may include a component such as a microprocessor for normalizing or characterizing the raw data. If the biometric recognition module 320 does not support the raw data processing, the biometric recognition module 320 may provide the raw data to the processor 310. In this case, the processor 310 may normalize or characterize the raw data fed from the biometric recognition module 320. Hereafter, for the sake of simplicity in the explanation, it is assumed that the biometric recognition module 320 outputs the biometric information by normalizing or characterizing the raw data. However, one or more embodiments of the disclosure are not limited to the case where the biometric recognition module 320 normalizes or characterizes the raw data.

According to an embodiment, the biometric recognition module 320 may obtain at least one biometric information recognized from one or more biometric types (e.g., fingerprint, iris, retina, hand geometry, face, voice, signature), and provide the obtained at least one biometric information to the processor 310. The biometric recognition module 320 may include, for example, an input device 321 (e.g., the input device 150 of FIG. 1), a sensor module 323 (e.g., the sensor module of FIG. 1 or FIG. 2) or a camera module 325 (e.g., the camera module 180 of FIG. 1). The processor 310 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the input device 321 may receive biometric information (e.g., voice or signature) corresponding to behavioral characteristics from the owner, an authentication target, or a third party, and provide the inputted biometric information to the processor 310. The biometric information corresponding to the voice or the signature inputted from the owner may be owner biometric information. The biometric information corresponding to the voice or the signature inputted from the authentication target may be input biometric information. The biometric information corresponding to the voice or the signature inputted from the third party may be auxiliary biometric information.

According to an embodiment, the sensor module 323 may recognize a physiological characteristic (e.g., fingerprint, iris or hand geometry) of the owner, the authentication target, or the third party, and provide biometric information corresponding to the recognized physiological characteristic to the processor 310. The biometric information corresponding to the fingerprint, the iris or the hand geometry inputted from the owner may be owner biometric information. The biometric information corresponding to the fingerprint, the iris or the hand geometry inputted from the authentication target may be input biometric information. The biometric information corresponding to the fingerprint, the iris or the hand geometry inputted from the third party may be auxiliary biometric information.

According to an embodiment, the camera module 325 may capture faces of the owner, the authentication target, or the third party, and provide biometric information corresponding to the captured face to the processor 310. The biometric information corresponding to the captured face of the owner may be owner biometric information. The biometric information corresponding to the captured face of the authentication target may be input biometric information. The biometric information corresponding to the captured face of the third party may be auxiliary biometric information.

According to an embodiment, the input device 321, the sensor module 323 or the camera module 325 of the electronic device 101 may be included in the biometric recognition module 320. The biometric recognition module 320 may be activated to acquire the owner biometric information from the owner initially setting the biometric recognition function. The biometric recognition module 320 may also be activated to acquire the input biometric information from the authentication target in response to a biometric authentication request, or to acquire the auxiliary biometric information from the third party or a stored image. The input device 321, the sensor module 323 or the camera module 325 of the biometric recognition module 320 may include, for example, a microprocessor (e.g., a sensor hub) for converting a biometric image into a digital form and generating biometric information using the converted digital signal. The microprocessor may thus be included in, for example, the biometric recognition module 320.

According to an embodiment, the processor 310 may apply main feature values extracted from the owner biometric information to a main matcher (or a first matcher), and apply auxiliary feature values extracted from the auxiliary biometric information to an auxiliary matcher (or a second matcher). For example, applying the extracted feature values to the matcher may include executing the matcher using the extracted values at the processor 310. The processor 310 may collect the auxiliary biometric information from, for example, biometric information such as a prestored photo, biometric information selected by a user, or biometric information inputted. The processor 310 may perform primary biometric authentication on the input biometric information by the main matcher, and perform secondary biometric authentication on the input biometric information by the auxiliary matcher after considering the result of the primary biometric authentication. If succeeding in the primary biometric authentication and failing the secondary biometric authentication, the processor 310 may determine that the input biometric information matches the owner biometric information.

According to an embodiment, the processor 310 may perform the biometric recognition by storing or matching for biometric recognition one or more biometric information provided from the biometric recognition module 320. The processor 310 may perform the biometric recognition in sequence of, for example, "acquisition→feature extraction→comparison→similarity determination." During the acquisition, the processor 310 may acquire the biometric information by converting a biometric trait of the biometric image into a digital form. During the feature extraction, the processor 310 may extract a feature value of a feature point which is unique and highly distinctive per individual from the biometric information. During the comparison, the processor 310 may compare the stored feature value with the input feature value. During the similarity determination, the processor 301 may determine the individual based on the comparison result, and/or based on a discriminant for minimizing false recognition. The stored feature value may be at least temporarily stored in, for example, the memory 330. The feature value temporarily stored in the memory may be updated by, for example, an event such as a user request.

According to an embodiment, the processor 310 may apply different feature values stored in the memory, to at least two matchers, perform the matching using the at least two matchers, and thus determine whether the input biometric information is authenticated. The processor 310 may identify whether the information extracted from the requester for the authentication belongs to the owner using the biometric authentication database (template) which temporarily stores reference information for each matcher, and thus verify that the requester is the owner.

According to an embodiment, the processor 310 may apply the main feature values extracted from the owner biometric information to the main matcher (e.g., the first matcher), and apply the auxiliary feature values extracted from the auxiliary biometric information which is highly similar to the owner biometric information, to the auxiliary matcher (e.g., the second matcher).

The auxiliary biometric information may be highly likely to be false recognized as, for example, the owner biometric information. For example, if the owner biometric information is acquired through the face recognition, the auxiliary biometric information may be biometric information extracted from a photo of the face of a family member or relative. The auxiliary biometric information may be extracted from a biometric image selected by the user, determined to be highly similar to the owner biometric information using the main matcher, or selected from biometric information of which the biometric recognition failed for the allowed number of times (e.g., 5 times) in a row. For example, in multimodal biometric authentication, if the biometric authentication failed with biometric information of a first type, biometric information of a second type may be selected as the auxiliary biometric information. The auxiliary biometric information may be selected through, for example, the main matcher. If the feature values extracted from the biometric information corresponding to at least one face in the stored photo is matched by the main matcher with the main feature values applied to the main matcher and the similarity over a specific level is identified, the processor 310 may select the corresponding biometric information as the auxiliary biometric information.

According to an embodiment, the main feature values may determine a plurality of feature points easily distinguished from others in the owner biometric information, and be extracted by values representing the features of the determined feature points. The auxiliary feature values may determine a plurality of feature points easily distinguished from others including the owner in the auxiliary biometric information, and be extracted by values representing the features of the determined feature points. The feature points and the type of the feature values may differ according to, for example, the type of the biometric information. The feature points for extracting the main feature values and the auxiliary feature values may be identical or may overlap with each other. For example, the features points for extracting the main feature values may include the feature points for extracting the auxiliary feature values.

According to an embodiment, the main feature values generated in the initial setting for the biometric authentication may be applied to the main matcher. The auxiliary feature values may be applied or updated to the auxiliary matcher every time, for example, the auxiliary biometric information is acquired. The processor 310 may apply the same or similar conditions to extract the main feature values and the auxiliary feature values. For example the processor 310 may apply the same or similar conditions to extract one feature value. The processor 310 may not apply all the auxiliary feature values extracted from the auxiliary biometric information to the auxiliary matcher, but may select and apply some auxiliary feature values easily distinguished from the main feature values among the extracted auxiliary feature values.

According to an embodiment, if the biometric recognition of the input biometric information is requested, the processor 310 may extract input feature values from the input biometric information, and match the input feature values with the main feature values using the main matcher. If the matching result of the main matcher satisfies a preset critical condition, the processor 310 may recognize that the input biometric information belongs to the owner. This may be referred to as primary biometric recognition or main biometric recognition. If recognizing the owner's input biometric information in the primary biometric recognition, the processor 310 may match some or all of the input feature values with the auxiliary feature values applied to the auxiliary matcher, through the auxiliary matcher. If the matching result of the auxiliary matcher does not satisfy the preset critical condition, the processor 310 may finally determine that the input biometric information belongs to the owner. This may be referred to as secondary biometric recognition or auxiliary biometric recognition.

For example, the processor 310 may perform the biometric recognition in the sequence of "input biometric information acquisition→input feature values extraction→comparison of the input feature values and the main feature values→primary similarity determination→comparison of the input feature values and the auxiliary feature values→secondary similarity determination."

According to an embodiment, if the input biometric information and the owner biometric information are similar enough to determine that the input biometric information and the owner biometric information belong to the same individual and the input biometric information and the auxiliary biometric information (e.g., biometric information similar to the owner biometric information) are not similar enough to determine that they belong to the same individual, the processor 310 may recognize that the input biometric information belongs the owner.

According to an embodiment, if recognizing the owner's input biometric information in the primary biometric recognition, the processor 310 may match some or all of the input feature values extracted from the input biometric information and the auxiliary feature values using the auxiliary matcher. If the matching result of the auxiliary matcher satisfies a preset critical condition, the processor 310 may compare first similarity (e.g., main similarity) and second similarity (e.g., auxiliary similarity), and finally determine whether the input biometric information belongs to the owner, based on the comparison result. The first similarity may indicate the similarity between the input feature values and the owner feature values, and the second similarity may indicate the similarity between the input feature values and the auxiliary feature values. If the first similarity is higher than the second similarity, the processor 310 may finally determine the owner's the input biometric information.

According to an embodiment, if the input biometric information and the owner biometric information are similar enough to determine that they belong to the same individual, the input biometric information and the auxiliary biometric information are also similar enough to determine that they belong to the same individual, and the input biometric information is more similar to the owner biometric information than the auxiliary biometric information, the processor 310 may determine the owner's the input biometric information.

According to an embodiment, the memory 330 may store instructions executed for the processor 310 to perform the biometric recognition. The memory 330 may store, for example, one or more owner biometric information for the biometric recognition, one or more auxiliary biometric information, the main feature values extracted from the one or more owner biometric information, and the auxiliary feature values extracted from the one or more auxiliary biometric information. The memory 330 may include, for example, an image database which stores photos for acquiring the auxiliary biometric information.

Figure 4:
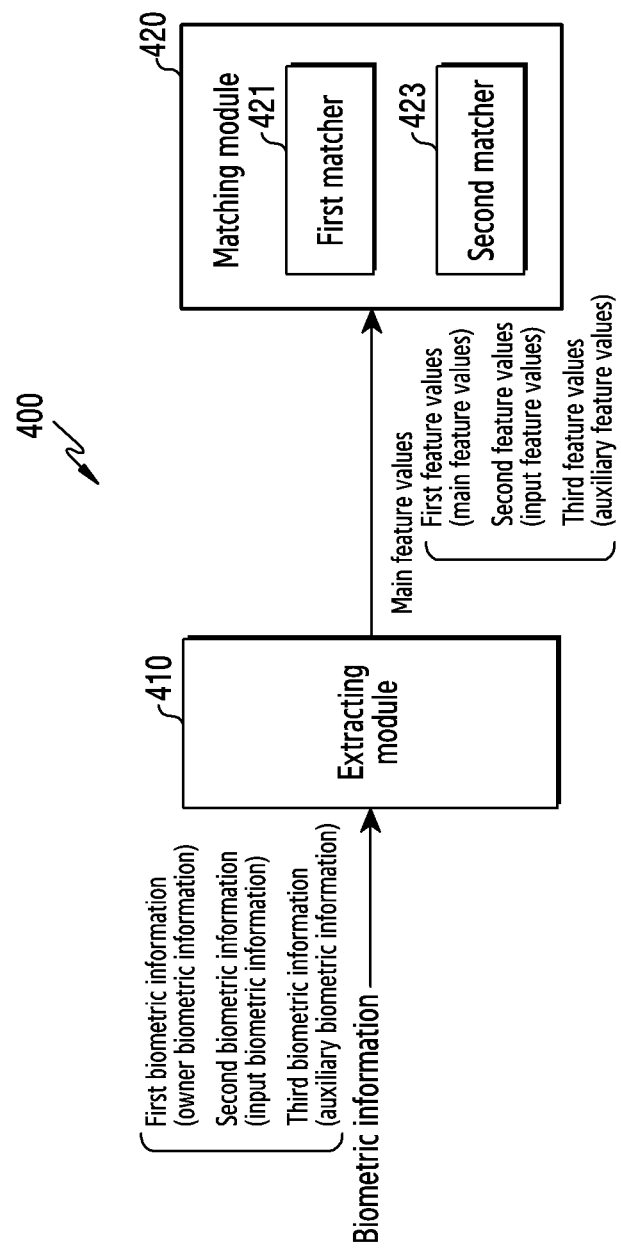
FIG. 4 is a block diagram of a biometric recognition device in an electronic device 101 according to an embodiment of the disclosure.

FIG. 4 is a block diagram of an electronic device (e.g., the electronic device 101 of FIG. 1) for biometric recognition according to an embodiment of the disclosure. Components in the electronic device 101 of FIG. 4 may be a set of one or more instructions stored by a processor (e.g., the processor 310 of FIG. 3) in a memory (e.g., the memory 330 of FIG. 3). For example, an extracting module 421 or a matching module 420 may correspond to a module implemented by the processor 310 by executing at least part of the instructions. Hereafter, for the sake of ease of explanation, the embodiment of FIG. 4 is implemented in software executed by the processor 310 of the electronic device 101. However, the instant disclosure is not so limited and the embodiment of FIG. 4 may be implemented in hardware.

Referring to FIG. 4, the electronic device 101 according to an embodiment may include the extracting module 410 and/or the matching module 420. The matching module 420 may include, for example, a first matcher 421 (e.g., a main matcher) and/or a second matcher 423 (e.g., an auxiliary matcher). The first matcher 421 and/or the second matcher 423 may be supplied with the feature values acquired by the matching module 420 from the biometric information for the biometric recognition, and then stored in the memory 330. For example, information (e.g., the main feature values, the auxiliary feature values) to be stored in the memory may be newly supplied to the first matcher 421 and/or the second matcher 423 of the matching module 420, or existing information of the matchers may be updated with the information (e.g., the main feature values, the auxiliary feature values) to be stored in the memory.

According to an embodiment, the extracting module 410 may extract feature values at a plurality of preset feature points from the biometric information of at least one of one or more biometric types (e.g., fingerprint, iris, retina, hand geometry, face, voice, and signature). The feature points may be determined, set, or stored by considering, for example, the type of the biometric information or features for easily identifying target biometric information from other biometric information. The biometric information may be one of, for example, the owner biometric information, the auxiliary biometric information or the input biometric information. The owner biometric information may be provided from the owner during the initialization for the biometric authentication. The auxiliary biometric information may be biometric information having high similarity to the owner biometric information. The auxiliary biometric information may be collected from the inputted or stored biometric information. The input biometric information may be inputted in a request for biometric recognition. The owner biometric information, the auxiliary biometric information or the input biometric information have been described earlier, and their detailed explanations shall not be duplicated.

According to an embodiment, the extracting module 410 may, for example, determine a plurality of main feature points in the owner biometric information for distinguishing the owner from other people, and extract main feature values of features of the determined main feature points from the owner biometric information. In addition, the extracting module 410 may, for example, determine a plurality of auxiliary feature points in the auxiliary biometric information for distinguishing the target person from other people including the owner, and extract auxiliary feature values of features of the determined auxiliary feature points from the auxiliary biometric information. The extracting module 410 may extract input feature values from a plurality of main feature points or a plurality of auxiliary feature points in, for example, the input biometric information.

According to an embodiment, the types of the feature points and the feature values may differ according to the type of the biometric information. The feature points for extracting the main feature values and the auxiliary feature values may be identical or may overlap. For example, the features points for extracting the main feature values may include the feature points for extracting the auxiliary feature values. The main feature values and the auxiliary feature values may be extracted by applying the same or similar conditions to the extracting module 410 (e.g., use one feature value extractor).

According to an embodiment, the matching module 420 may apply the main feature values extracted from the extracting module 410 to the first matcher 421. For example, the feature values generated in the initial setting for the biometric authentication may be applied to the first matcher 421. The first matcher 421 may compare the input feature values extracted at the extracting module 410 with the main feature values, and output a biometric recognition result by determining whether the input biometric information is the owner biometric information, based on the comparison result. For example, if the input feature values match the main feature values over a preset threshold, the first matcher 421 may recognize that the input biometric information is the owner biometric information.

According to an embodiment, the matching module 420 may apply the auxiliary feature values extracted at the extracting module 410 to the second matcher 423. The second matcher 423 may be newly supplied with or updated with new auxiliary feature values every time, for example, the auxiliary biometric information is acquired. All the auxiliary feature values extracted by the extracting module 410 may not be applied to the second matcher 423, but some auxiliary feature values easily distinguished from the main feature values among the extracted auxiliary feature values may be selected and applied. If the first matcher 421 recognizes that the input biometric information is the owner biometric information, the second matcher 423 may compare the input feature values extracted at the extracting module 410 with the auxiliary feature values, and re-identify whether the input biometric information is the owner biometric information based the comparison result. For example, if the input feature values do not match the auxiliary feature values over a preset threshold, the second matcher 423 may recognize that the input biometric information is the owner biometric information.

According to an embodiment, the matching module 420 may perform primary matching between the input feature values and the main feature values through the first matcher 421, and determine whether the first matching result satisfies a preset critical condition. If determining the owner's input biometric information, the matching module 420 may perform secondary matching between some or all of the input feature values and the auxiliary feature values through the second matcher 423. If the matching result of the second matcher 423 does not satisfy a preset critical condition, the matching module 420 may finally determine the owner's input biometric information. This may be referred to as the secondary biometric recognition or the auxiliary biometric recognition.

For example, the biometric recognition module 400 of FIG. 4 may perform the biometric recognition in the procedure of "input biometric information acquisition→input feature values extraction→comparison of the input feature values and the main feature values→primary similarity determination→comparison of the input feature values and the auxiliary feature values→secondary similarity determination."

According to an embodiment, if the input biometric information and the owner biometric information are similar enough to determine that they belong to the same individual and the input biometric information and the auxiliary biometric information (e.g., biometric information similar to the owner biometric information) are not similar enough to determine that they belong to the same individual, the matching module 420 may recognize that the input biometric information belongs the owner.

For example, if recognizing the owner's input biometric information in the primary biometric recognition, the matching module 420 may match some or all of the input feature values with the auxiliary feature values, through the second matcher 423. If the matching result of the second matcher 423 satisfies a preset critical condition, the matching module 420 may compare first similarity (e.g., main similarity) and second similarity (e.g., auxiliary similarity), and finally determine whether the input biometric information belongs to the owner, based on the comparison result. The first similarity may indicate the similarity between the input feature values and the owner feature values, and the second similarity may indicate the similarity between the input feature values and the auxiliary feature values. If the first similarity is higher than the second similarity, the matching module 420 may finally determine the owner's the input biometric information.

According to an embodiment, if the input biometric information and the owner biometric information are similar enough to determine that they belong to the same individual, the input biometric information and the auxiliary biometric information are also similar enough to determine that they belong to the same individual, and the input biometric information is more similar to the owner biometric information than the auxiliary biometric information, the matching module 420 may determine the owner's the input biometric information.

For ease of understanding, it has been described in FIG. 4 that the matching module 420 or the first matcher 421 or the second matcher 423 of the matching module 420 autonomously performs the matching operation. However, the corresponding operation may be conducted substantially by the processor, the matching module 421, the first matcher 421 or the second matcher 423.

Figure 5:
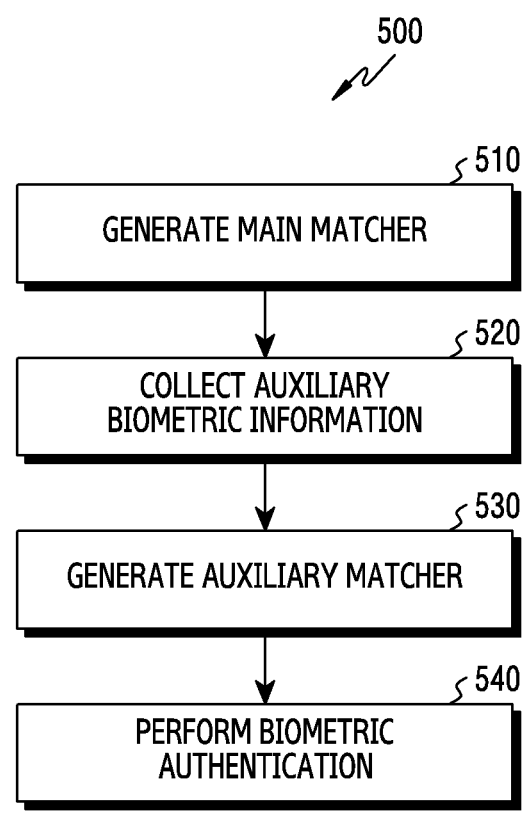
FIG. 5 is a flowchart of operations for performing biometric authentication in an electronic device 101 according to an embodiment of the disclosure.

FIG. 5 is a flowchart 500 of operations for performing biometric authentication in an electronic device (e.g., the electronic device 101 of FIG. 1) according to an embodiment of the disclosure. According to an embodiment, a processor (e.g., the processor 310 of FIG. 3) of the electronic device 101 may operate as shown in FIG. 5.

Referring to FIG. 5, in operation 510 according to an embodiment, the electronic device 101 may generate a main matcher to which main feature values for the biometric authentication are applied. For example, the main feature values extracted from the owner biometric information in the initial setting for the biometric authentication may be applied to the main matcher. The main feature values may be acquired by features extracted from a plurality of main feature points from the owner biometric information. The main feature points may be determined to be features points that can be used to easily distinguish others from the owner in the owner biometric information.

In operation 520 according to an embodiment, the electronic device 101 may collect auxiliary biometric information. The auxiliary biometric information may be biometric information highly likely to be false recognized as the owner biometric information. The auxiliary biometric information may be biometric information extracted from, for example, a face image of a family member or a relative. The main matcher generated in operation 510 may be used to collect the auxiliary biometric information. For example, the main matcher may be used to identify similarity between target biometric information and the owner biometric information, and to designate and/or store the target biometric information selected based on the identified similarity as the auxiliary biometric information.

According to an embodiment, after storing the owner biometric information, the electronic device 101 may collect auxiliary biometric information from prestored data according to data selected by the user (owner). The prestored data may be, for example, a file stored in the electronic device 101, a file stored in a server connected over a communication network such as Internet, or an image such as a photo selected from photos. If it is difficult to automatically sort other biometric information such as fingerprint, iris, or voice, rather than the face, the electronic device 101 may request the user to input the auxiliary biometric information, and collect biometric information inputted in response to the request as the auxiliary biometric information.

For example, the electronic device 101 may collect biometric information selected by the user from the stored biometric information or newly inputted as the auxiliary biometric information. The stored biometric information may be, for example, the image stored in the electronic device 101 or the image stored in the server accessed via the communication network such as Internet. The newly inputted biometric information may be acquired by requesting the user to additionally store the biometric information such as fingerprint, iris, or voice, of which the automatic similar data sorting is difficult.

For example, the electronic device 101 may compare the prestored image with an image of the owner stored as the owner biometric information, and collect the auxiliary biometric information from the prestored image, which may contain two or more faces of high similarity. Herein, the auxiliary biometric information may be acquired from at least one similar face, except for the face most similar to the owner biometric information among the two or more similar faces in the prestored image. The auxiliary biometric information may be acquired by, for example, converting an image of an object corresponding to the similar face to a digital signal.

In another example, if the biometric recognition fails for a preset number of times (e.g., 5 times) in a row and the device is locked, the electronic device 101 may store at least one biometric information of the failed biometric recognition as the auxiliary biometric information after lock of the device is released. To store the at least one biometric information of the failed biometric recognition as the auxiliary biometric information, the electronic device 101 may recommend the user to store the corresponding biometric information as the auxiliary biometric information. If the user accepts to store the biometric information in response to the recommendation, the electronic device 101 may store the corresponding biometric information as the auxiliary biometric information.

In yet another example, if biometric recognition with the multimodal biometric information (e.g., iris+face) is supported and the biometric recognition with the biometric information of the first type (e.g., iris) fails, the electronic device 101 may store the biometric information of the second type (e.g., face) as the auxiliary biometric information. The types of the biometric information of the multimodal biometric information are not limited to iris and face but may be fingerprint, iris, retina, hand geometry, face, voice, and/or signature.

According to an embodiment, in operation 530, the electronic device 101 may generate an auxiliary matcher to which the auxiliary feature values are applied. The auxiliary feature values to be applied to the auxiliary matcher may be generated by the collected auxiliary biometric information. To generate the auxiliary matcher, the electronic device 101 may extract the auxiliary feature values from the collected auxiliary biometric information. The electronic device 101 may extract the auxiliary feature values by using a feature value extraction requirement (e.g., a same feature extractor) used to extract the main feature values. The electronic device 101 may compare the extracted auxiliary feature values with the main feature values, and sort the extracted auxiliary feature values in descending order of the feature value difference based on the comparison. The electronic device 101 may select one or more auxiliary feature values (e.g., N-ary feature values) distinguished from the main feature values among the sorted auxiliary feature values. For example, the electronic device 101 may determine a threshold for distinguishing from the main feature values, and select N-ary (smaller than M) auxiliary feature values which satisfy the determined threshold among the sorted M-ary auxiliary feature values. The electronic device 101 may generate the auxiliary matcher by storing and/or applying the selected N-ary auxiliary feature values to the auxiliary matcher. In the secondary matching for identifying whether the input biometric information is the owner biometric information, the auxiliary matcher may be used to further determine the similarity with the input feature values by using only the N-ary feature values.

According to an embodiment, in operation 540, the electronic device 101 may perform the biometric authentication for identifying whether the input biometric information is the owner biometric information, using the main matcher and/or the auxiliary matcher. For example, if receiving the input biometric information for requesting the biometric recognition, the electronic device 101 may extract the input feature values from the input biometric information. The input feature values may be extracted by applying same or similar conditions of the main feature values or the auxiliary feature values (e.g., using one feature extractor).

According to an embodiment, the electronic device 101 may acquire first similarity by matching the input feature values and the main feature features through the main matcher. The electronic device 101 may determine whether the first similarity satisfies a first critical condition. The first critical condition may be set, stored, or designated to determine whether the input biometric information is the owner biometric information. The first critical condition may be a crucial factor for determining the false biometric recognition rate. For example, if the first critical condition is set high, the false biometric recognition rate (e.g., the rate of incorrectly recognizing the inputted biometric information of others as the owner biometric information) may be lowered but the processing time of the biometric recognition may be delayed. By contrast, if the first critical condition is set low, the processing time of the biometric recognition may be reduced but the false biometric recognition rate may increase. Hence, the first critical condition needs to be optimized by considering both of the false recognition rate and the delay time. Certain embodiments of the disclosure may lower the false recognition rate and reduce the processing time of the biometric recognition.

According to an embodiment, if the first similarity satisfies the first critical condition, the electronic device 101 may acquire second similarity by matching some or all of the input feature values with the auxiliary feature values through the auxiliary matcher. The electronic device 101 may determine whether the second similarity satisfies a second critical condition. The second critical condition may be set, stored, or designated to determine whether the input biometric information and the auxiliary biometric information (the biometric information similar to the owner) belong to the same person. The second critical condition may be a crucial factor for determining the false biometric recognition rate. For example, if the second critical condition is set high, the processing time of the biometric recognition may be reduced but the false biometric recognition rate may increase. By contrast, if the second critical condition is set low, the false biometric recognition rate may be lowered but the processing time of the biometric recognition may be delayed. Hence, the second critical condition needs to be optimized by considering both of the false recognition rate and the delay time. Certain embodiments of the disclosure may lower the false recognition rate and reduce the processing time of the biometric recognition.

According to an embodiment, if determining through the main matcher that the input biometric information is the owner biometric information (or determining that the target of the input biometric information is the same person as the owner) and determining through the auxiliary matcher that the input biometric information is not the auxiliary biometric information (or determining that the target of the input biometric information is different from the target of the similar biometric information), the electronic device 101 may finally determine that the input biometric information is the owner biometric information. As mentioned above, the false biometric recognition may be lowered, by verifying through the auxiliary matcher whether the target of the input biometric information is different from another person having the similar biometric information as the owner.

According to an embodiment, to further lower the false biometric recognition rate, the electronic device 101 may perform additional determination with the first similarity and the second similarity. For example, if the auxiliary matcher determines that the target of the input biometric information is the person similar to the owner (e.g. a family member) and the first similarity is determined to be higher than the second similarity, the electronic device 101 may determine that the target of the input biometric information is the owner, rather than the similar person.

Figure 6:
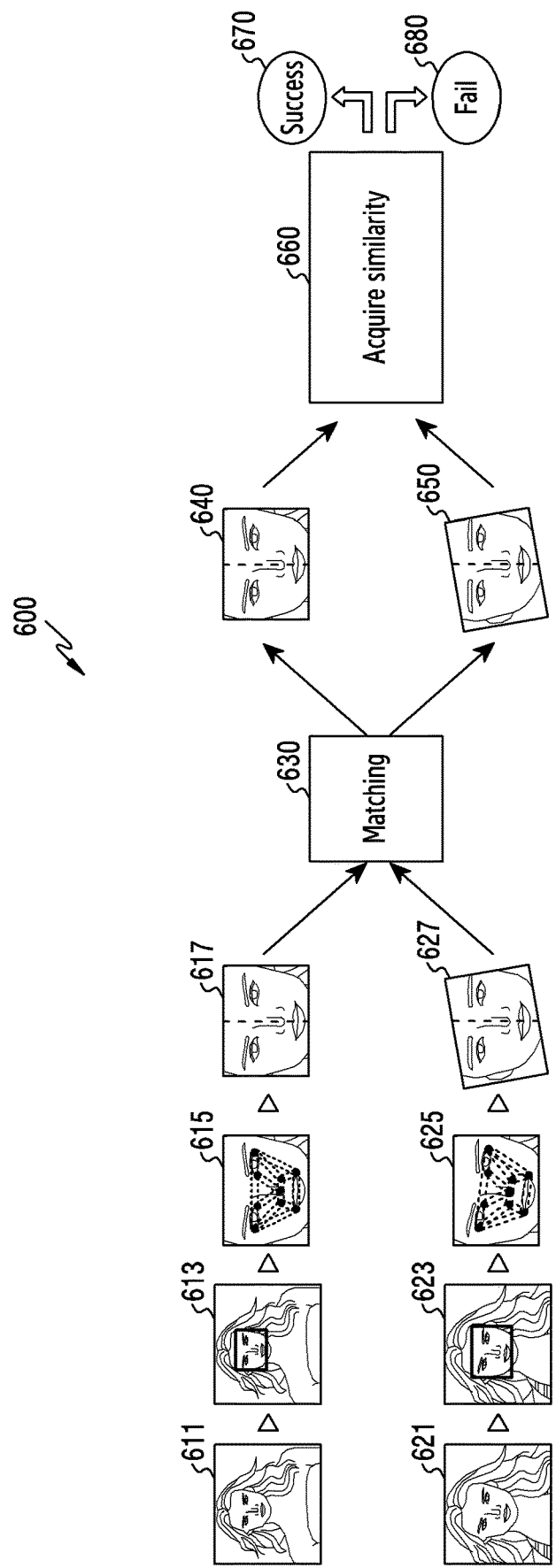
FIG. 6 is a diagram illustrating biometric recognition in an electronic device 101 according to an embodiment of the disclosure.

FIG. 6 is a diagram 600 illustrating biometric recognition in an electronic device (e.g., the electronic device 101 of FIG. 1) according to an embodiment of the disclosure. The biometric recognition may be fulfilled in the sequence of "acquisition→feature extraction→comparison→similarity determination." According to an embodiment, face recognition is assumed in FIG. 6. However, it is noted that biometric information of other types (e.g., fingerprint, iris, signature, hand geometry) may be adopted.

Referring to FIG. 6, the electronic device 101 according to an embodiment may load an owner image 611 and an input image 621. The input image 621 may be an image inputted to attempt the biometric authentication or an auxiliary image inputted to further verify the biometric recognition. The auxiliary image may be, for example, a photo including a face of a person (e.g., a hacker) having similar biometric information as the owner.

According to an embodiment, the electronic device 101 may acquire a first face image from the owner image 611 (operation 613), and acquire a second face image from the input image 621 (operation 623). The electronic device 101 may preset, store, or designate an area in the owner image and an area in the input image to acquire the first and second face images.

According to an embodiment, the electronic device 101 may determine first feature points of the first face image acquired from the owner image 611 (operation 615), and determine second feature points of the second face image acquired from the input image 621 (operation 625). The first feature points and the second feature points may or may not be positioned at the same points in the corresponding face image. The first feature points and the second feature points may be determined to be positions (e.g., left corner and right corner of an eye, left corner and right corner of a nose) having distinctive features to distinguish the two faces in the corresponding face images. The first feature points and the second feature points may be determined by recognizing predesignated points and extracting all or some of the recognized points. Each feature point may include data (e.g., a feature value) for distinguishing the shape, size, or some other element in the image.

According to an embodiment, the electronic device 101 may align the first face image and the second face image (operations 617 and 627) by considering the first and second feature points. The alignment may align, for example, the first face image and the second face image, which are graphical elements, with a virtual reference line. The alignment may ease the feature comparison of the first face image and the second face image.

According to an embodiment, the electronic device 101 may extract first feature values (e.g., main feature values or auxiliary feature values) from the feature points of the aligned first face image, extract feature values from the second feature points (e.g., the input feature values or the auxiliary feature values) of the aligned second face image, and match the first feature values and the second feature values (operation 630).

According to an embodiment, based on the matching result of the first feature values and the second feature values, the electronic device 101 may process (e.g., preprocess) the first face image and the second face image (operations 640 and 650). The electronic device 101 may acquire similarity (operation 660) by comparing the first and second feature values of the processed first face image and second face image. Based on the acquired similarity, the electronic device 101 may determine success (operation 670) or failure (operation 680) of the biometric authentication of the input image 621.

Figure 7:
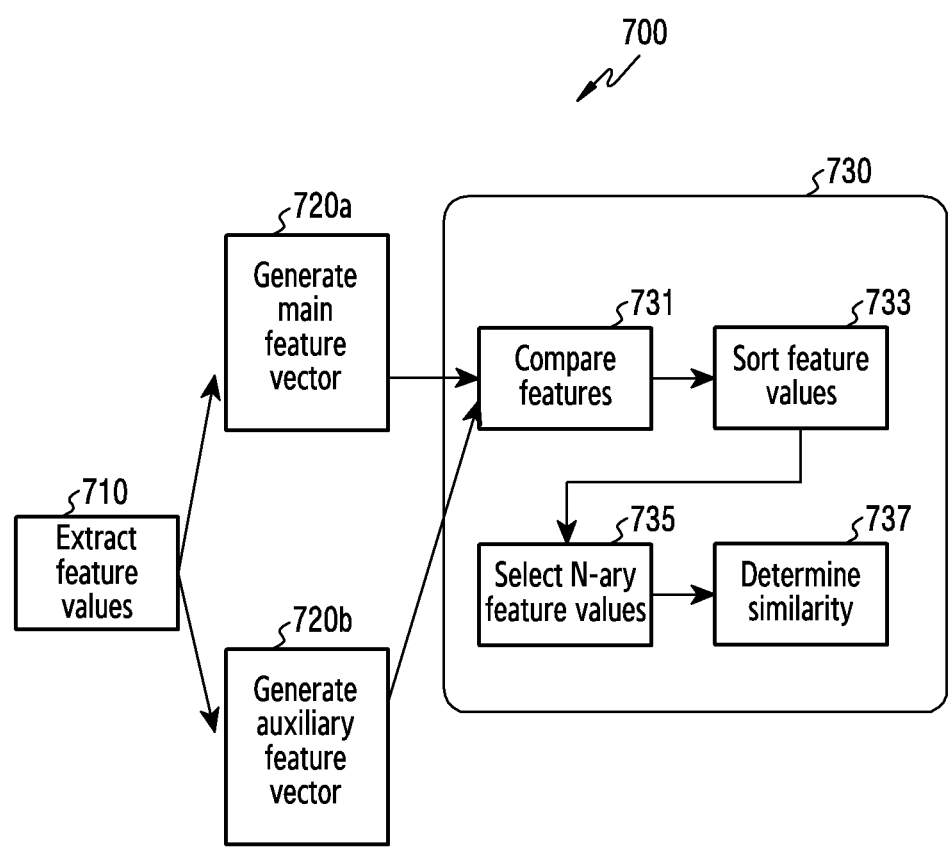
FIG. 7 is a diagram illustrating operations for executing an auxiliary matcher in an electronic device 101 according to an embodiment of the disclosure.

FIG. 7 is a diagram 700 illustrating operations (e.g., operation 530 of FIG. 5) for applying auxiliary feature values to an auxiliary matcher in an electronic device (e.g., the electronic device 101 of FIG. 1) according to an embodiment of the disclosure. According to an embodiment, the operations of FIG. 7 may be carried out substantially by a processor (e.g., the processor 120 of FIG. 1, the processor 310 of FIG. 3, or the matching module 420 of FIG. 4) of the electronic device 101.

Referring to FIG. 7, in operation 710 according to an embodiment, the electronic device 101 may extract feature values (e.g., main feature values, input feature values or auxiliary feature values) from biometric information (e.g., owner biometric information, input biometric information or auxiliary biometric information).

In operation 720a according to an embodiment, the electronic device 101 may generate a main feature vector using the main feature values extracted from the owner biometric information. In operation 720b according to an embodiment, the electronic device 101 may generate an auxiliary feature vector using the auxiliary feature values extracted from the auxiliary biometric information.

In operation 730 according to an embodiment, the electronic device 101 may compare the main feature vector and the auxiliary feature vector, and determine feature values to be applied to the auxiliary matcher based on the comparison result. The electronic device 101 may compare, for example, the main feature vector and the auxiliary feature vector per feature point in operation 731. The electronic device 101 may sort the auxiliary feature values of the auxiliary feature vector in, for example, descending order of the feature value difference based on the comparison in operation 733.

Table 2 shows an example of the sorted auxiliary feature values.

TABLE 2

| Max | Feature 10 |
|---|---|
| ... | ... |
|  | Feature x |
| ... | ... |
| Min | Feature 7 |

Referring to Table 2, the tenth auxiliary feature value has the greatest difference from the main feature value, and the seventh auxiliary feature value has the most similar difference to the main feature value.

In operation 735 according to an embodiment, the electronic device 101 may select N-ary auxiliary feature values distinguished from the main feature values among the sorted auxiliary feature values. For example, the electronic device 101 may determine a threshold for distinguishing from the main feature value, and select the N-ary (smaller than M) auxiliary feature values which satisfy the determined threshold among the sorted M-ary auxiliary feature values.

In operation 737 according to an embodiment, the electronic device 101 may determine the similarity between the owner biometric information and the auxiliary biometric information based on the selected N-ary auxiliary feature values, and thus determine the auxiliary feature values to be applied to the auxiliary matcher. In the secondary matching for identifying whether the input biometric information is the owner biometric information, the auxiliary matcher may be used to further determine the similarity with the input feature values by using only the N-ary feature values.

Figure 8:
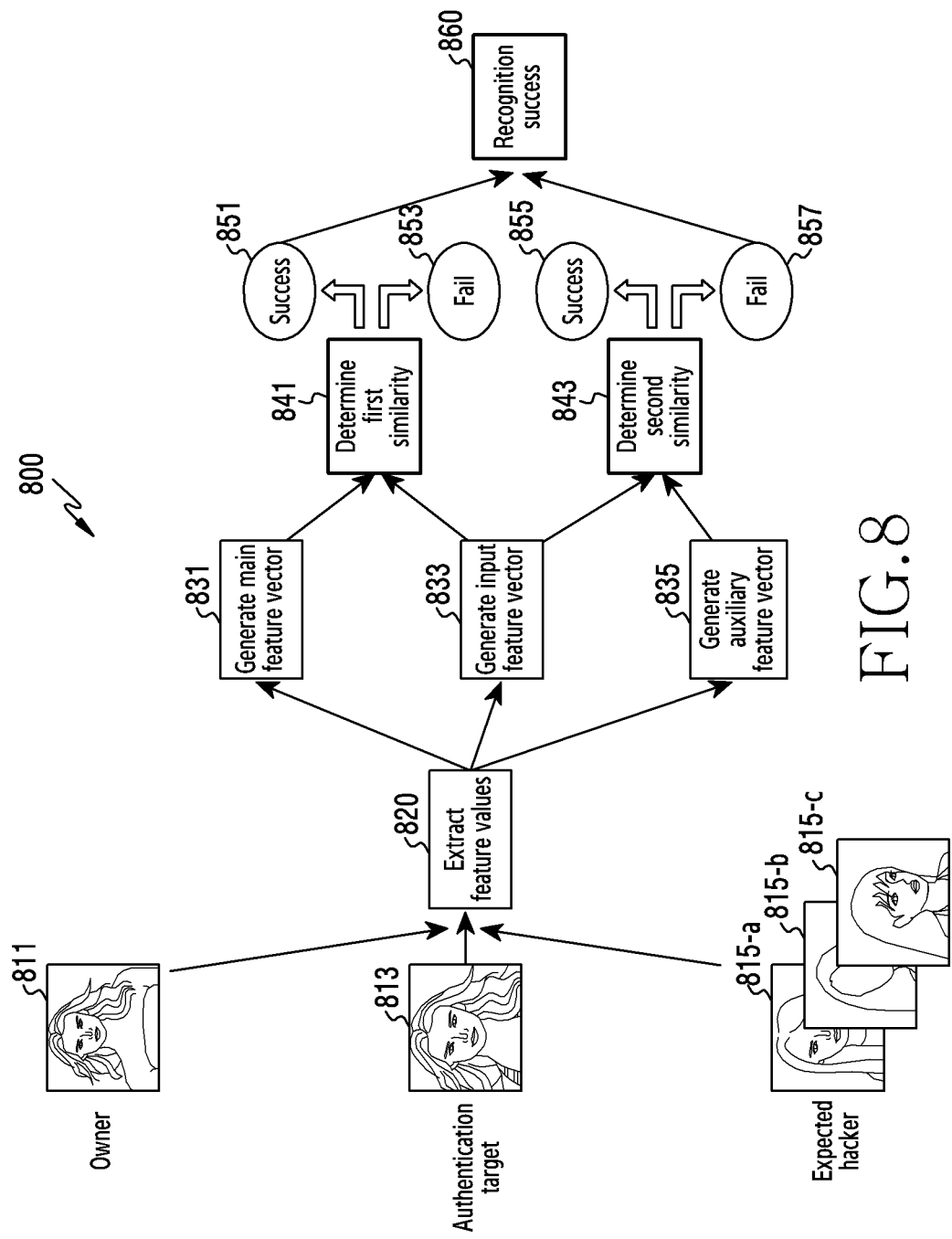
FIG. 8 is a diagram illustrating an example of operations for performing biometric recognition in an electronic device 101 according to an embodiment of the disclosure.

FIG. 8 is a diagram 800 illustrating an example of operations (e.g., operation 540 of FIG. 5) for performing biometric recognition in an electronic device (e.g., the electronic device 101 of FIG. 1) according to an embodiment of the disclosure. According to an embodiment, the operations of FIG. 8 may be fulfilled substantially by a processor (e.g., the processor 120 of FIG. 1, the processor 310 of FIG. 3, or the matching module 420 of FIG. 4) of the electronic device 101.

Referring to FIG. 8, according to an embodiment, the electronic device 101 may receive an owner image corresponding to owner biometric information in operation 811, receive an input image corresponding to authentication target biometric information in operation 813, and receive an auxiliary image corresponding to hacker biometric information having the similar biometric information to the owner in operations 815a through 815c.

In operation 820 according to an embodiment, the electronic device 101 may extract main feature values from the owner image, extract input feature values from the input image, and extract auxiliary feature values from the auxiliary image.

According to an embodiment, the electronic device 101 may generate a main feature vector with the main feature values in operation 831, generate an input feature vector with the input feature values in operation 833, and generate an auxiliary feature vector with the auxiliary feature values in operation 835.

In operation 841 according to an embodiment, the electronic device 101 may compare the main feature value and the input feature vector, and determine first similarity between the owner biometric information and the authentication target biometric information based on the comparison result. In operation 843 according to an embodiment, the electronic device 101 may compare the input feature value and the auxiliary feature vector, and determine second similarity between the authentication target biometric information and the hacker biometric information based on the comparison result.

According to an embodiment, the electronic device 101 may determine success (operation 851) or failure (operation 853) of the biometric recognition of the authentication target based on the determined first similarity. According to an embodiment, the electronic device 101 may determine success (operation 855) or failure (operation 857) of the biometric recognition of the authentication target based on the determined second similarity. That is, the electronic device 101 may finish the biometric recognition of the authentication target through the primary determination with the owner biometric information and the secondary determination with the auxiliary biometric information.

In operation 860 according to an embodiment, the electronic device 101 may finally recognize that the input biometric information matches the owner biometric information (succeed in the biometric recognition) only if succeeding in the biometric recognition with the first similarity and failing the biometric recognition with the second similarity.

Figure 9:
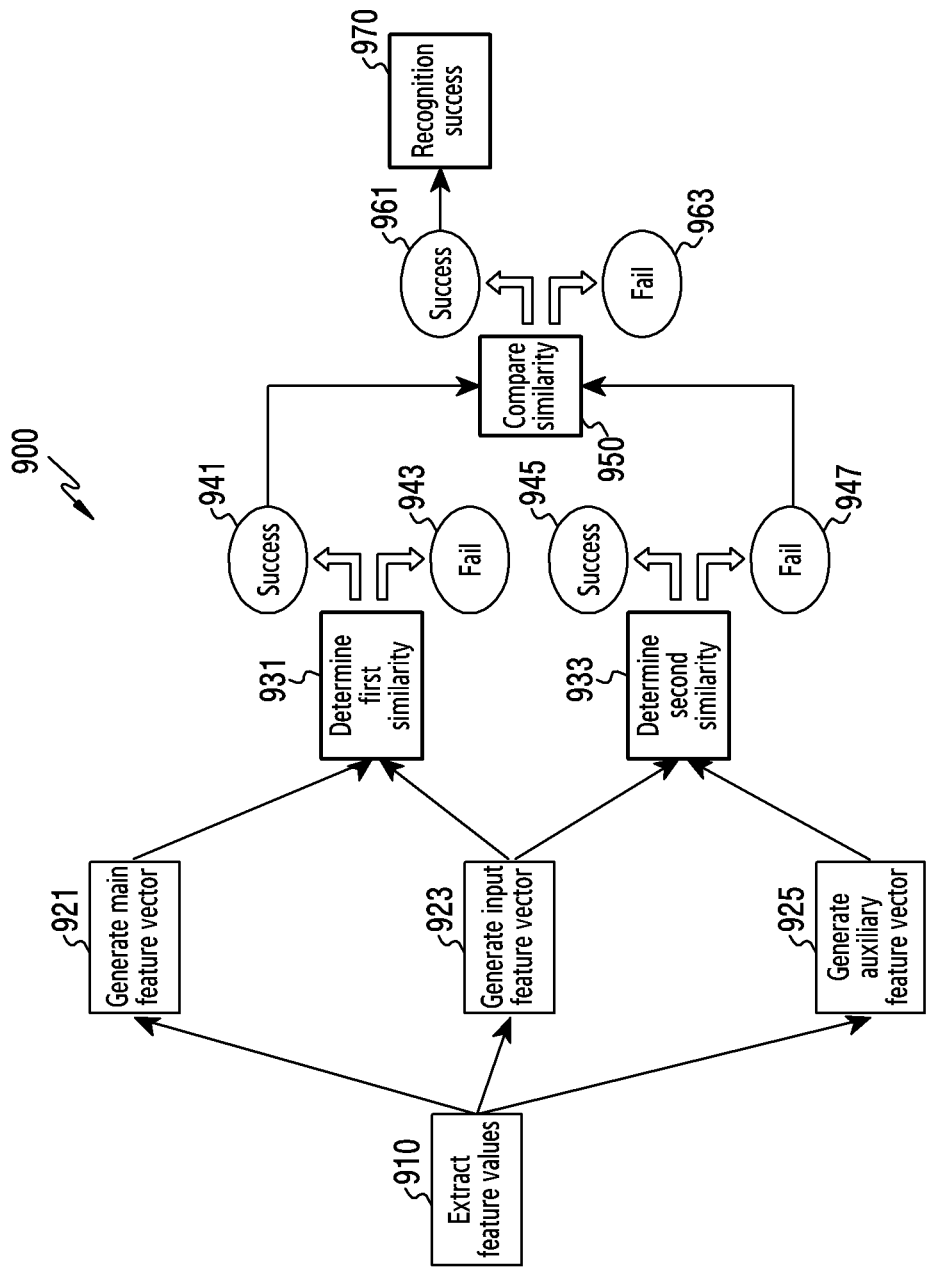
FIG. 9 is a diagram illustrating another example of operations for performing biometric recognition in an electronic device 101 according to an embodiment of the disclosure.

FIG. 9 is a diagram 900 illustrating another example of operations (e.g., operation 540 of FIG. 5) for performing biometric recognition in an electronic device (e.g., the electronic device 101 of FIG. 1) according to an embodiment of the disclosure. According to an embodiment, the operations of FIG. 9 may be carried out substantially by a processor (e.g., the processor 120 of FIG. 1, the processor 310 of FIG. 3, or the matching module 420 of FIG. 4) of the electronic device 101.

Referring to FIG. 9, in operation 910 according to an embodiment, the electronic device 101 may extract main feature values from an owner image corresponding to owner biometric information, extract input feature values from an input image corresponding to authentication target biometric information, and extract auxiliary feature values from an auxiliary image corresponding to hacker biometric information having similar biometric information to the owner.

According to an embodiment, the electronic device 101 may generate a main feature vector with the main feature values in operation 921, generate an input feature vector with the input feature values in operation 923, and generate an auxiliary feature vector with the auxiliary feature values in operation 925.

In operation 931 according to an embodiment, the electronic device 101 may compare the main feature vector and the input feature vector, and determine first similarity based on the comparison result. In operation 933 according to an embodiment, the electronic device 101 may compare the input feature vector and the auxiliary feature vector, and determine second similarity based on the comparison result.

According to an embodiment, the electronic device 101 may determine success (operation 941) or failure (operation 943) of the biometric recognition of the input image based on the determined first similarity. According to an embodiment, the electronic device 101 may determine success (operation 945) or failure (operation 947) of the biometric recognition of the input image based on the determined second similarity. For example, the electronic device 101 may determine that the input biometric information matches the owner biometric information (succeed in the biometric recognition of the input image) if succeeding in the biometric authentication based on the first similarity and failing the biometric authentication based on the second similarity. Alternatively, the electronic device 101 may determine that the input biometric information does not match the owner biometric information (fail the biometric recognition of the input image) if failing the biometric authentication based on the first similarity and succeeding in the biometric authentication based on the second similarity.

In operation 950 according to an embodiment, if succeeding in the biometric recognition with both of the first and second similarities, the electronic device 101 may finally determine whether the biometric recognition is successful (whether the biometric recognition of the input image is successful) by comparing the first similarity and the second similarity.

According to an embodiment, if the biometric recognition with the second similarity is successful but the first similarity is relatively higher than the second similarity, the electronic device 101 may determine that the input biometric information matches the owner biometric information (operation 961). Otherwise, if the first similarity is not relatively higher than the second similarity, the electronic device 101 may determine that the input biometric information does not match the owner biometric information (operation 963).

In operation 790 according to an embodiment, the electronic device 101 may determine that the first similarity is relatively higher than the second similarity, and thus finally recognize that the input biometric information matches the owner biometric information (that the input image is the owner image).

According to various embodiments of the disclosure, an electronic device using biometric recognition may improve security and raise user confidence in biometric authentication, by achieving a false accept ratio (FAR) over a specific level.

An electronic device (e.g., the electronic device 101 shown in FIG. 1) according to an embodiment may include: one or more memories; and at least one processor for accessing the one or more memories, wherein at least one of the one or more memories stores instructions, when executed, causing the at least one processor to, determine M-ary feature points to obtain first feature values from owner biometric information, and identify auxiliary biometric information from a biometric information stored in at least one of the one or more memories or an external server, wherein the auxiliary biometric information has similar feature values with the owner biometric information at the M-ary feature points.

According to an embodiment, the auxiliary biometric information is selected by at least one of a user or a first matcher to which the first feature values are applied.

According to an embodiment, the instructions cause the at least one processor to, when biometric authentication with input biometric information fails, identify the input biometric information of the failed biometric authentication as additional auxiliary biometric information.

According to an embodiment, the instructions cause the at least one processor to, in biometric authentication using first biometric information of a first type and second biometric information of a second type together, when biometric authentication with the first biometric information fails, identify the second biometric information as additional auxiliary biometric information.

According to an embodiment, the instructions cause the at least one processor to, obtain M-ary second feature values from the auxiliary biometric information by applying the M-ary feature point for obtaining the first feature values from the owner biometric information to the auxiliary biometric information, select N-ary third feature values corresponding to N-ary feature points among the M-ary second feature values by considering similarity between the M-ary second feature values and the first feature values, and apply the N-ary third feature values to a second matcher.

According to an embodiment, the instructions cause the at least one processor to, select feature values of which the similarity with the first feature values is lower than a first threshold among the M-ary second feature values, as the N-ary third feature values.

According to an embodiment, the instructions cause the at least one processor to, sort the M-ary second feature values based on the similarity between the M-ary second feature values and the first feature values, and select the N-ary third feature values from the M-ary second feature values based on the sorting.

According to an embodiment, the instructions cause the at least one processor to, obtain fourth feature values corresponding to the M-ary feature points from input biometric information, perform first biometric authentication on the input biometric information by matching the first feature values and the fourth feature values using the first matcher, when the first biometric authentication using the first matcher is successful, perform second biometric authentication on the input biometric information by matching fifth feature values corresponding to the N-ary feature points among the fourth feature values and the N-ary third feature values using the second matcher, and when the second biometric authentication fails, approve biometric authentication on the input biometric information.

According to an embodiment, the instructions cause the at least one processor to, when the second biometric authentication is successful, compare first similarity between the first feature values and the fourth feature values with second similarity between the N-ary third feature values and the fifth feature values, and when the first similarity is higher than the second similarity, approve the biometric authentication on the input biometric information.

According to an embodiment, the instructions cause the at least one processor to, identify the owner biometric information by converting a face image of an owner into a digital form, wherein the auxiliary biometric information includes at least one face having feature values of which similarity with the first feature values is higher than a threshold.

A biometric authentication method in an electronic device (e.g., the electronic device 101 shown in FIG. 1), in accordance with an embodiment may include: determining M-ary feature points to obtain first feature values from owner biometric information; identifying auxiliary biometric information from a biometric information stored in at least one of one or more memories or an external server; and performing biometric authentication on input biometric information based on the owner biometric information and the auxiliary biometric information, wherein the auxiliary biometric information has similar feature values with the owner biometric information at the M-ary feature points.

According to an embodiment, the auxiliary biometric information is selected by at least one of a user or a first matcher to which the first feature values are applied.

According to an embodiment, the method may further include: when failing biometric authentication with the input biometric information, identifying the input biometric information of the failed biometric authentication as additional auxiliary biometric information.

According to an embodiment, the method may further include: in biometric authentication using first biometric information of a first type and second biometric information of a second type together, when failing biometric authentication by the first biometric information, identifying the second biometric information as additional auxiliary biometric information.

According to an embodiment, the performing biometric authentication further comprises: obtaining M-ary second feature values from the auxiliary biometric information by applying the M-ary feature points for obtaining the first feature values from the owner biometric information to the auxiliary biometric information; selecting N-ary third feature values corresponding to N-ary feature points among the M-ary second feature values by considering similarity between the second feature values and the first feature values; and applying the N-ary third feature values to a second matcher.

According to an embodiment, the method may further include selecting feature values of which the similarity with the first feature values is lower than a first threshold among the M-ary second feature values, as the N-ary fourth feature values.

According to an embodiment, the selecting the fourth feature values comprises: sorting the M-ary second feature values based on the similarity between the M-ary second feature values and the first feature values; and selecting the N-ary fourth feature values from the M-ary second feature values based on the sorting.

According to an embodiment, the performing biometric authentication further comprises: obtaining fourth feature values corresponding to the M-ary feature points from the input biometric information; performing first biometric authentication on the input biometric information by matching the first feature values and the fourth feature values using the first matcher; when succeeding in the first biometric authentication using the first matcher, performing second biometric authentication on the input biometric information by matching fifth feature values corresponding to the N-ary feature points among the fourth feature values with the N-ary third feature values using the second matcher; and when failing the second biometric authentication, approving biometric authentication on the input biometric information.

According to an embodiment, the method may further include: when succeeding in the second biometric authentication, comparing first similarity between the first feature values and the fourth feature values and second similarity between the N-ary third feature values and the fifth feature values; and when the first similarity is higher than the second similarity, approving the biometric authentication on the input biometric information.

According to an embodiment, the extracting the second feature values further comprises: identifying the owner biometric information by converting a face image of an owner into a digital form; wherein the auxiliary biometric information includes at least one face having feature values of which similarity with the first feature values is higher than a threshold.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:
1. An electronic device comprising:
one or more memories; and
at least one processor for accessing the one or more memories, wherein at least one of the one or more memories stores instructions, when executed, causing the at least one processor to:
- receive input biometric information from a user of the electronic device,
- determine M-ary feature points to obtain first feature values from owner biometric information from an owner of the electronic device, and
- identify auxiliary biometric information from a biometric information of a party known to be different from the owner, that is stored in at least one of the one or more memories or an external server, and
- authenticate the user based at least in part on a comparison between the input biometric information to the owner biometric information and the auxiliary biometric information from the biometric information of the party known to be different from the owner,
- wherein the auxiliary biometric information has similar feature values with the owner biometric information at the M-ary feature points.

2. The electronic device of claim 1, wherein the auxiliary biometric information is selected by at least one of the user or a first matcher to which the first feature values are applied.

3. The electronic device of claim 2, wherein the instructions further cause the at least one processor to:
- obtain M-ary second feature values from the auxiliary biometric information by applying the M-ary feature points for obtaining the first feature values from the owner biometric information to the auxiliary biometric information,
- select N-ary third feature values corresponding to N-ary feature points among the M-ary second feature values by considering similarity between the M-ary second feature values and the first feature values, and
- apply the N-ary third feature values to a second matcher.

4. The electronic device of claim 3, wherein the instructions further cause the at least one processor to:
- select feature values of which the similarity with the first feature values is lower than a first threshold among the M-ary second feature values, as the N-ary third feature values.

5. The electronic device of claim 3, wherein the instructions further cause the at least one processor to:
- sort the M-ary second feature values based on the similarity between the M-ary second feature values and the first feature values, and
- select the N-ary third feature values from the M-ary second feature values based on the sorting.

6. The electronic device of claim 5, wherein the instructions further cause the at least one processor to:
- obtain fourth feature values corresponding to the M-ary feature points from the input biometric information,
- perform first biometric authentication on the input biometric information by matching the first feature values and the fourth feature values using the first matcher,
- when the first biometric authentication using the first matcher is successful, perform second biometric authentication on the input biometric information by matching fifth feature values corresponding to the N-ary feature points among the fourth feature values and the N-ary third feature values using the second matcher, and
- when the second biometric authentication fails, approve biometric authentication on the input biometric information.

7. The electronic device of claim 6, wherein the instructions further cause the at least one processor to:
- when the second biometric authentication is successful, compare first similarity between the first feature values and the fourth feature values with second similarity between the N-ary third feature values and the fifth feature values, and
- when the first similarity is higher than the second similarity, approve the biometric authentication on the input biometric information.

8. The electronic device of claim 1, wherein the instructions further cause the at least one processor to:
- when biometric authentication with the input biometric information fails, identify the input biometric information as additional auxiliary biometric information.

9. The electronic device of claim 1, wherein the instructions further cause the at least one processor to:
- in biometric authentication using first biometric information of a first type and second biometric information of a second type together, when biometric authentication with the first biometric information fails, identify the second biometric information as additional auxiliary biometric information.

10. The electronic device of claim 1, wherein the instructions further cause the at least one processor to:
- identify the owner biometric information by converting a face image of the owner into a digital form,
- wherein the auxiliary biometric information includes at least one face having feature values of which similarity with the first feature values is higher than a threshold.

11. The electronic device of claim 1, wherein authenticating the user further comprises:
- authenticating the user when the input biometric information sufficiently similar to the owner biometric information and sufficiently different from the auxiliary biometric information from the biometric information of the party known to be different from the owner.

12. A method for biometric authentication in an electronic device, the method comprising:
- receiving input biometric information from a user of the electronic device,
- determining M-ary feature points to obtain first feature values from owner biometric information from an owner of the electronic device;
- identifying auxiliary biometric information from a biometric information of a party known to be different from the owner, that is stored in at least one of one or more memories or an external server; and
- authenticating the user based at least in part on a comparison between the input biometric information to the owner biometric information and the auxiliary biometric information from the biometric information of the party known to be different from the owner,
- wherein the auxiliary biometric information from the biometric information of the party known to be different from the owner has similar feature values with the owner biometric information from the owner of the electronic device at the M-ary feature points.

13. The method of claim 12, wherein the auxiliary biometric information is selected by at least one of a user or a first matcher to which the first feature values are applied.

14. The method of claim 13, wherein authenticating the user further comprises:
- obtaining M-ary second feature values from the auxiliary biometric information by applying the M-ary feature points for obtaining the first feature values from the owner biometric information to the auxiliary biometric information;
selecting N-ary third feature values corresponding to N-ary feature points among the M-ary second feature values by considering similarity between the M-ary second feature values and the first feature values; and
applying the N-ary third feature values to a second matcher.

15. The method of claim 14, further comprising selecting feature values of which the similarity with the first feature values is lower than a first threshold among the M-ary second feature values, as N-ary fourth feature values.

16. The method of claim 14, wherein selecting the N-ary third feature values further comprises:
sorting the M-ary second feature values based on the similarity between the M-ary second feature values and the first feature values; and
selecting N-ary fourth feature values from the M-ary second feature values based on the sorting.

17. The method of claim 16, wherein authenticating the user further comprises:
obtaining fourth feature values corresponding to the M-ary feature points from the input biometric information
performing first biometric authentication on the input biometric information by matching the first feature values and the fourth feature values using the first matcher;
when succeeding in the first biometric authentication using the first matcher, performing second biometric authentication on the input biometric information by matching fifth feature values corresponding to the N-ary feature points among the fourth feature values with the N-ary third feature values using the second matcher; and
when failing the second biometric authentication, approving biometric authentication on the input biometric information.

18. The method of claim 17, further comprising:
when succeeding in the second biometric authentication, comparing first similarity between the first feature values and the fourth feature values and second similarity between the N-ary third feature values and the fifth feature values; and
when the first similarity is higher than the second similarity, approving the biometric authentication on the input biometric information.

19. The method of claim 12, further comprising:
when failing biometric authentication with the input biometric information, identifying the input biometric information as additional auxiliary biometric information.

20. The method of claim 12, further comprising:
in biometric authentication using first biometric information of a first type and second biometric information of a second type together, when failing biometric authentication by the first biometric information, identifying the second biometric information as additional auxiliary biometric information.

21. The method of claim 12, further comprising extracting second feature values, wherein extracting the second feature values further comprises:
identifying the owner biometric information by converting a face image of the owner into a digital form;
wherein the auxiliary biometric information includes at least one face having feature values of which similarity with the first feature values is higher than a threshold.

22. The method of claim 12, wherein authenticating the user further comprises:
authenticating the user when the input biometric information sufficiently similar to the owner biometric information and sufficiently different from the auxiliary biometric information from the biometric information of the party known to be different from the owner.

* * * * *